Feb. 27, 1951 M. P. FABREGAT 2,543,315
MACHINE FOR DEVULCANIZING AND REGENERATING
VULCANIZED RUBBER
Filed April 15, 1947 4 Sheets-Sheet 2

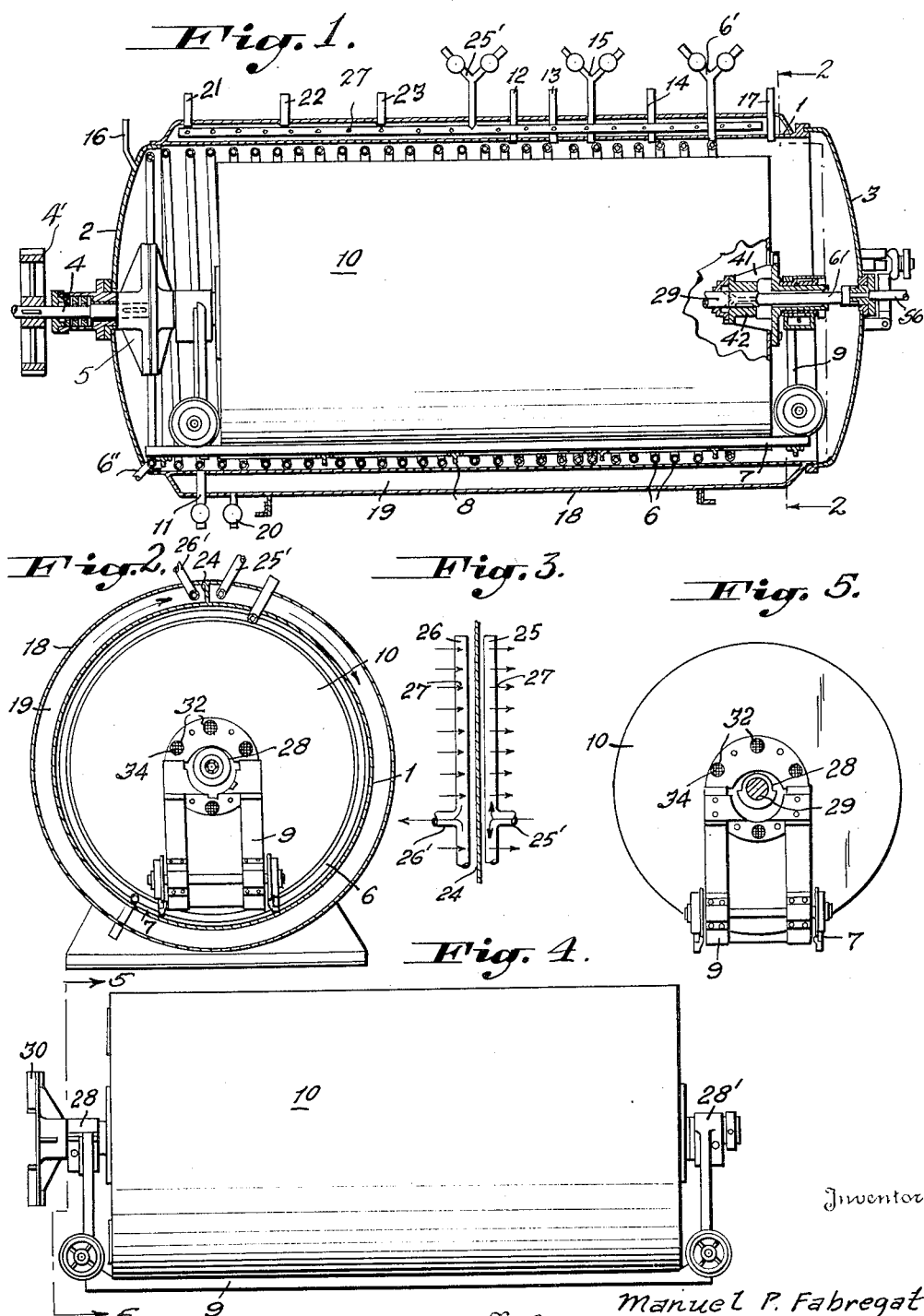

Inventor
Manuel P. Fabregat
By
Attorneys

Feb. 27, 1951 M. P. FABREGAT 2,543,315
MACHINE FOR DEVULCANIZING AND REGENERATING
VULCANIZED RUBBER
Filed April 15, 1947 4 Sheets-Sheet 3
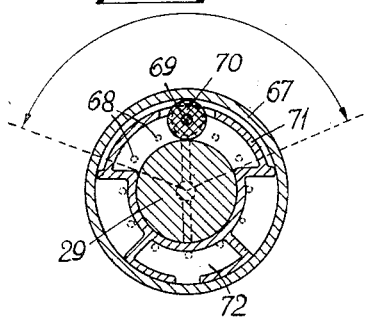
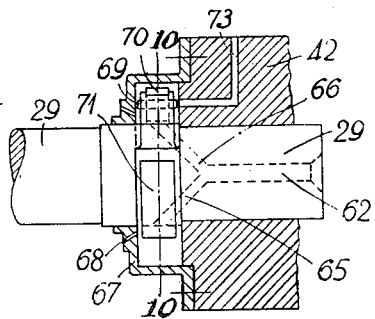
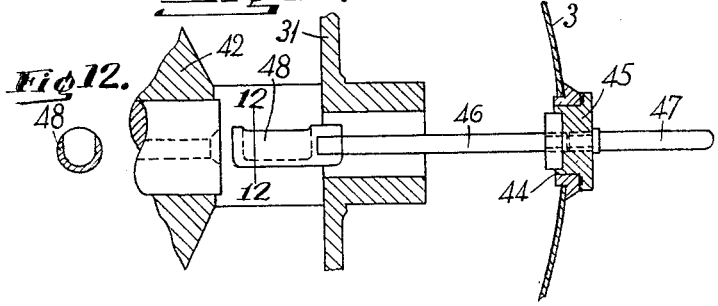
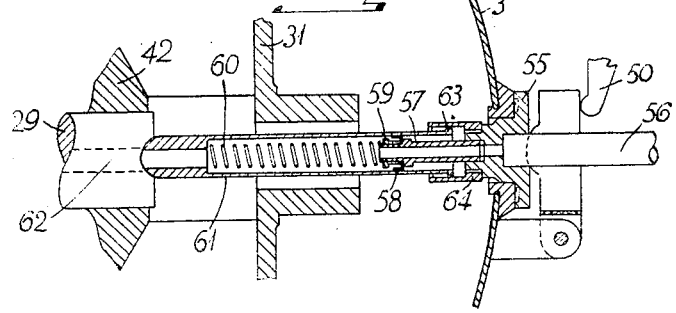
Inventor
M. Punsola Fabregat
By Glascock Downing & Seebold
Attys Feb. 27, 1951            M. P. FABREGAT            2,543,315
MACHINE FOR DEVULCANIZING AND REGENERATING
VULCANIZED RUBBER
Filed April 15, 1947                                  4 Sheets—Sheet 4
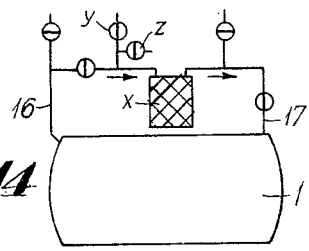
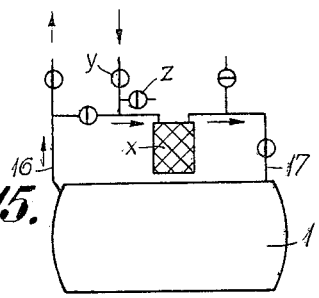
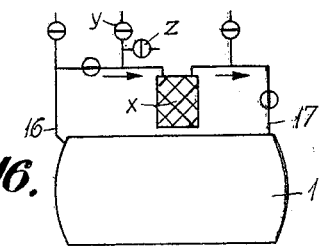
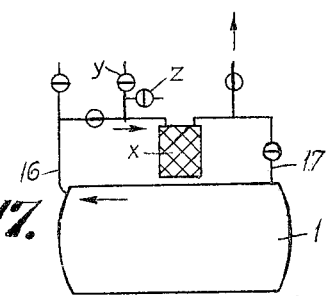
Inventor
M. Punsola Fabregat
By Glascock Downing Seebold
Attys.

Patented Feb. 27, 1951

2,543,315

UNITED STATES PATENT OFFICE 2,543,315

MACHINE FOR DEVULCANIZING AND RE-
GENERATING VULCANIZED RUBBER

Manuel Punsola Fabregat, Barcelona, Spain

Application April 15, 1947, Serial No. 741,626
In Spain May 21, 1946

4 Claims. (Cl. 18—2)

The present invention relates to an improved machine for devulcanizing and regenerating natural or synthetic vulcanized rubber.

More particularly the invention relates to a machine of the autoclave type embodying a rotatable drum or container for the material to be treated removably positioned within a double-walled casing and in connection with which machine three independent heating means are provided including means to apply heat directly to the material within the container, means to heat the space between the double walls of the casing and additional heating means within the inner wall of the casing.

The invention further relates to a machine of the character referred to in which a removable cover closes one end of the double-walled casing and in which the drum or container is supported on a shaft having axial passages therein and in which there is an axial aperture in one end of the drum in alignment with an aperture in the removable cover and through which apertures can be inserted a sampling spoon or an injection nozzle through which nozzle heating fluid is placed into direct contact with the material within the drum or container independent of the rotation of the drum and independent of any of the three first-mentioned heating means, and a releasable locking means is carried by the exterior of the removable closure or cover for retaining within the drum either the injection means or the sampling spoon.

It therefore follows in view of the independent control of the various heating means the material to be treated that is placed within the drum can have heating fluid in direct contact therewith, it can be heated by conduction or radiation, and combinations of these heating means may be obtained.

It is a further object of this invention to provide a machine in which the heating can be varied and samples taken of the material being treated or the additional injection means can be utilized without stopping rotation of the drum within the casing.

It is an additional object to provide an arrangement in which, if desired, a vacuum can be applied to the interior of the drum while the same is rotating.

The accompanying drawings illustrate by way of example the preferred form of the machine, in accordance with the present invention and in which:

Figure 1 is a longitudinal view of the machine partly in section and partly in elevation;

Figure 2 is an end view partly in section and partly in elevation taken along lines 2—2 of Figure 1;

Figure 3 is a fragmentary diagrammatic view of a portion of the perforated tubing applying heat to the space between the walls of the casing;

Figure 4 is a side view of the rotatable drum and its carriage;

Figure 5 is an end view partly in section taken along the lines 5—5 of Figure 4;

Figure 9 is an enlarged fragmentary view illustrating details of the distributing member controlling the distribution of the heating fluid injected into the drum from the injection means;

Figure 10 is a cross sectional view taken on lines 10—10 of Figure 9;

Figure 11 is an enlarged fragmentary view representing the machine with the sampling spoon inserted;

Figure 12 is a cross sectional view taken on line 12—12 of Figure 11;

Figure 13 is an enlarged fragmentary sectional view illustrating a portion of the machine with the injection means inserted within the drum and Figures 14 through 17 are diagrammatic illustrations showing a portion of the circuit of one of the heating means and illustrating different phases of operation.

Figure 6:
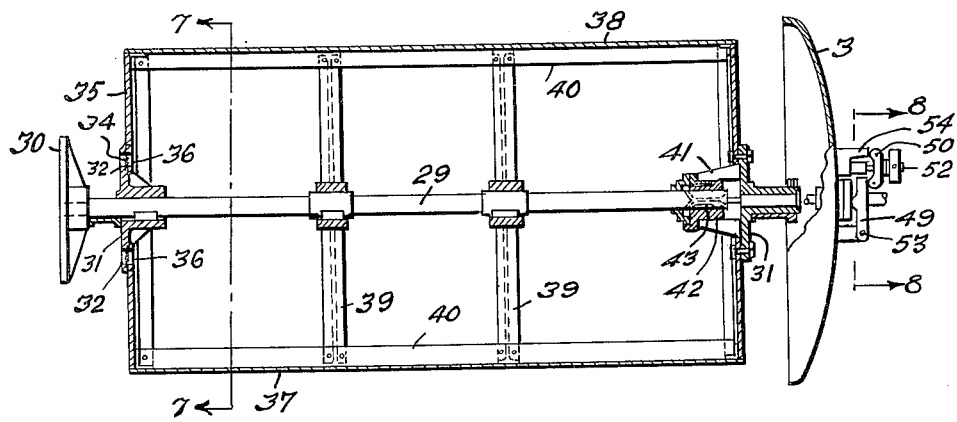
Figure 6 is a longitudinal view partly in section and partly in elevation of the drum and the removable cover for the casing.

Referring more particularly to the drawings, the machine in accordance with the present invention includes a double-walled casing having an internal cylindrical wall 1 and a spaced external wall 18. To one end of the casing is welded or riveted a closure or bottom 2 which is provided with a suitable bearing receiving and supporting a driving shaft 4 receiving power from any suitable means such as the gear 4'. The shaft 4 projects into the inner casing and on its inner end carries a driving element 5 for cooperation with an element referred to hereinafter incorporated with the rotatable drum and its carriage end through which rotation is imparted to the drum. Within the inner casing 1 is disposed a tubing arrangement 6 having a valve controlled inlet 6' and an outlet 6" and through which tubing a suitable heating fluid either circulates or is retained therein depending upon operation of the valves shown in the inlet and valves not shown utilized in connection with the outlet. With these valves the regulation of this heating means is independent of the other heating means incorporated with the machine. Within the tubular casing 1, spaced rails 7 are supported on transverse elements 8. Removably positioned within the casing is a rotatable drum illustrated in Figure 4 as including a wheeled carriage 9 provided with spaced bearings 28 and 28' journalling a shaft 29 carrying the drum indicated generally by the numeral 10. This carriage is rolled within the inner casing and the element 30 carried at one end of the shaft 29, as illustrated more particularly in Figure 7, as comprising a forked member, is coupled with the conventional driving disc 5, which has pins, not shown, projecting therefrom that engage between the forks of the element 30 to rotate the drum. The inner casing 1 is provided with a valved drain pipe 11 and additional tubes 12, 13 and 14 which are to carry a pressure guage, a thermometer, and a safety valve, respectively, not shown. A further tube 15 projects within the inner casing and through which either saturated or supersaturated steam depending upon which of the valves carried by the tube 15 is actuated and through which tube 15 the steam enters into direct contact with the material in the drum in a manner referred to hereinafter. Additional tubes 16 and 17 also communicate with the interior of the casing and as illustrated diagrammatically in Figures 14 through 17, these tubes communicate respectively with the suction and delivery orifices of an air compressor x and suitable valves are provided in this circuit to effect various controls of the operation. The valves y and z communicate respectively with a source of vapors or gases and the atmosphere. Additional valves are provided in the branches connecting the tubes 16 and 17 with the compressor to control fluid flow therethrough in a manner referred to hereinafter. The space between the inner casing 1 and the outer casing 18 is designated by the reference numeral 19 and an additional heating means is incorporated with the machine to heat this space. This heating means as indicated in Figures 2 and 3 includes valved inlet and outlet tubes 25' and 26' communicating respectively with elongated tubes 25 and 26 provided with perforations 27 disposed on opposite sides of a partition 24 extending longitudinally of the space 19 and constraining the fluid to circulate in either a circular path as indicated by the arrows in Figure 2, around the perimeter of the inner casing from the inlet 25' to the outlet 26' or to remain stationary within the space 19 if the valves in the outlet 26' are closed. The respective inlet and outlet tubes are provided with valve controlled branches in a manner similar to the tube 15 permitting utilization of either saturated or superheated steam or steam and another heating fluid depending upon circumstances. The annular space is provided with a valve drain cock 20 and tubes 21, 22 and 23 carry respectively a pressure gage, a thermometer, and a safety valve, not shown.

Therefore it can be seen that an arrangement is presented in which there are three independent heating means for heating respectively the space between the inner and outer walls of the casing, for heating the interior of the inner casing and thereby the exterior of the drum by means of the tubing 6 and further heating fluid introduced directly into the inner casing and which heating fluid passes into direct contact with the material within the drum.

Figure 7:
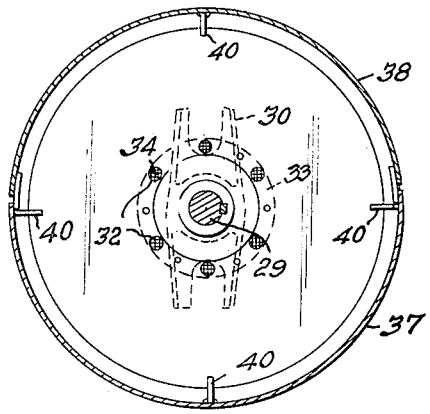
Figure 7 is a sectional view along lines 7—7 of Figure 6.

Referring more particularly to the details and structure of the drum, as indicated previously, the bearings 23 and 28' support the shaft 29. These bearings are provided with a suitable lubrication system to compensate for the high temperature existing within the inner casing. The opposite ends or heads 35 of the drum are fixed to discs 31. The disc 31 on the left of the drum as shown in Figure 6 is keyed to the shaft 29 and is provided with a series of apertures 32 and a circular channel 33 as indicated in Figure 7. The head or end 35 of the drum is also provided with a series of apertures 36 in alignment with the apertures 32 and between the head and the disc is disposed screening or wire gauze 34 as indicated in Figures 5, 6, and 7. It is therefore seen that these screened apertures provide for permanent communication between the interior of the drum and the interior of the inner casing 1 in a manner permitting passage of heating fluid into direct contact with the material from without the drum.

As shown in Figures 6 and 7 the drum 10 includes the body part 37 having a fluid tight cover 38 and which cover can be removed to permit insertion of material within the drum. One or more four-arm spiders 39 extend from a shaft 29 and carry longitudinal vanes 40 uniformly spaced about the circumference of the interior of the drum and which vanes impart movement to the material within the drum as the drum rotates, thereby insuring intimate and direct contact of the gases or vapors within the drum with the material and further facilitating evacuation of any gases or vapors emitted by the material due to the heating action.

Generally, the drum is continuously rotated although if desired the movement of the drum may be intermittently rotated in alternate directions and in some instances it is desirous to merely oscillate the drum with merely fractions of rotations less than 360°. The means for imparting such movement to the drum being conventional are not shown.

The end of the drum remote from the driving coupling 5 also includes the elements 31, 34 and 35 referred to previously. However, in this instance the disc 31 is perforated at its center and carries arms 41 which connect the disc to a block 42 keyed to shaft 29 so that rotation of the shaft transmits rotation through the block and the arms 41 to the disc and hereby the drum.

Figure 8:
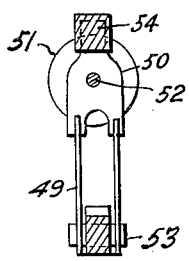
Figure 8 is an enlarged sectional view along lines 8—8 of Figure 6 illustrating the features of the releasable locking means carried by the exterior of the removable cover.

As indicated in Figures 11 and 12 the sampling device includes a plug member 45 insertable within an orifice 44 in the removable cover 3, a rod 46 having an external handle 47 is fixed to the plug and carries a spoon-like element 48 at the opposite end thereof. It is seen that when a conventional closure plug is removed from the orifice 44 and the plug 45 inserted therein, the spoon element 48 is disposed within the interior of the drum between the end of the shaft 29 and the inner surface of the disc 31. The outer surface of the plug 45 carries a suitable indication denoting the position of the spoon member 48. The locking means for retaining the sampling device in a position as indicated in Figures 6 and 8 includes a double arm lever 49 which abuts against and applies pressure to the outer surface of the plug 45. The pressure is applied by means of a bridge element 50 rotatably mounted on a stud 52 and adapted to bear at one end on the support member 54 projecting from the cover 3 and at its other end on the free ends of the lever 49. Pressure is applied to the bridge by means of a nut 51 on the stud element 52.

In utilizing the sampling device the arrangement operates as follows: with the drum within the casing and after removing the conventional closure plug, the plug 45 together with the spoon member 48 is inserted within the aperture 44 and through the aperture in the disc 31 with the mouth of the plug inverted. The locking element is applied and the sampling spoon is locked within the drum. After the drum has rotated sufficiently to require sampling the nut 51 is slackened, the bridge 50 is turned to free the lever 49 which is removed from engagement with the plug, and then by turning the handle 47 the spoon is reversed so that its mouth faces upwards, then with the drum rotating some of the material carried by the vanes or blades 40 falls into the spoon 48 and when it is considered that the spoon is full the same is withdrawn by means of the handle 47.

In connection with the injection means, the locking means including the locking element 49 perform the same function. The injection means comprises two principal members, namely an injection tube illustrated in Figure 13 and a distributing member illustrated in detail in Figures 9 and 10. When the injection tube which is telescopic is positioned within the drum, it is retained therein in the same manner as the sampling device although the particular position of the plug 55 and the injection means is not important. As indicated in Figure 13 this plug 55 receives on one side a feed tube 56 which is connected to either a pump, a compressor, or a steam engine injector according to circumstances. To the other side of the plug is fixed a hollow piston or plunger rod 57 the end of which is provided with a collar 58 of leather or other material held in position by a cylindrical nut 59. Bearing against the nut 59 is a spring 60 the opposite end of which bears against a shoulder on the inner surface of a telescopic tube 61. This tube which is provided with a hemispherical end surface is placed into contact with a conical mouth of a channel 62 provided in the shaft 29. The opposite end of tube 61 is provided with a flange 63 which abuts against an inturned flange on a sleeve member 64 secured to the plug 55 thereby preventing separation of the tube 61 from the plug and insuring that the hollow rod 57 remains within the tube. As indicated in Figure 13 the diameter of the sleeve 64 bears such relation to the flange on the tube 61 so that this factor in combination with the shape of the end of the tube 61 and the conical mouth of the channel 62 insures contact between the tube and the mouth of the channel even in the event of misalignment of the body of the injection tube with the center of the channel or if there is a variation in length between the seat of the plug 65 and the end of the shaft 29. The injection tube is locked in position as previously indicated by means of the locking element 49 held in position by the bridge member 50.

The other principal part of the injection means comprises the distributing arrangement. Due to the influence of gravity the material in the drum tends to assume a position in the lower part thereof. The channel 62 in the shaft 29 is divided into divergent branches 65 and 66 as indicated in Figure 9 and since the drum is habitually filled with material to the height of the shaft, without controlling the outlet of fluid from the channels 65 and 66, that part of the material situated at the end of the drum adjacent the injection means would be excessively saturated while the material at the other end of the drum would not receive sufficient saturation.

To remedy this difficulty the inner end of the block member 42 that is keyed to the shaft 29 is provided with an annular casing 67 through which extends a series of passages 68 that are inclined with respect to the horizontal axis of the shaft. Within this casing 67 is provided a distributing member 71 which is suspended from a pin 69 journalling a roller 70 that is free with respect to the shaft 29 and rotated thereby. The lower part of the distributing member 71 fills the casing 67 but does not rub laterally against the inner wall of the casing or against the adjacent end of the block 42. This lower part of the member 71 is provided with a chamber 72 that is filled with lead. This structure results in an arrangement in which the member 71 remains stationary and in the same position even though the shaft 29, the casing 67, and the block element 42 rotate, since the rotation of the shaft merely rotates the roller 70 relative thereto. A channel 73 is provided in the block 42 through which fluid injected into the channel 62 is carried and injected onto the material above the shaft 29 and the casing 67. It is therefore seen an arrangement is presented with gravitational means for preventing rotation of the distributing member with the shaft and which distributing member closes the duct 68 when they are directed downwardly but permits them to open when they are directed upwardly.

In operation of the device with the injection means inserted, the liquids, vapors, or gases coming from the tube 56 pass through telescopic tube 61 into the channel 62 and thence into the branches 65 and 66. At a predetermined upper sector of the distributor 71, as indicated in Figure 10, the outlet channels 68 are in communication with the branches of the channel 62, therefore fluid passes outwardly through these channels 68 when they are inclined upwardly and also through channel 73. However, when the channel 73 is directed downwardly due to rotation of the shaft and the block 42, the lower portion of the distributing member 72 blocks communication between the branches of the channel 62, the channel 73, and the channels 68 when they are directed downwardly. It therefore follows that injection takes place only in an upward direction into the gaseous medium surrounding the material in the drum and thence into direct contact with the material. The liquids or gases injected do not, therefore, collide directly with material below the shaft 29 since the outlet orifices or channels are closed by the distributing device 71.

It is, of course, obvious that suitable heat insulation means can be provided to cover the autoclave.

In connection with the diagrammatic illustrations in Figures 14 through 17 several arrangements utilizing the pipes or tubes 16 and 17 in the air compressor are disclosed. In Figure 14 is illustrated diagrammatically the introduction of gases or vapors into the interior of the inner casing, the gases entering through valve y thence proceeding through the compressor and then through pipe 17 with the valve in pipe 17 being open.

In Figure 13 is illustrated an arrangement for introducing gases or vapors into the drum and providing circulation by opening the valve controlling the outlet pipe 1, the other valves being disposed in the same relation as in Figure 12.

In Figure 14 is disclosed an arrangement for circulating air, gases, or vapors in a closed circuit within the inner casing. The main inlet and outlet valves being closed and the valve controlling communication between the pipe 10 and the compressor being open and the valve in the pipe 17 between the compressor and the casing 1 being open.

In Figure 17 is disclosed an arrangement for producing a vacuum within the inner casing and as disclosed the outlet of the compressor is in communication with the exterior and the only other valve that is open is the valve between the outlet tube 16 and the inlet to the compressor. Therefore, the action of the compressor produces the vacuum within the casing 1.

Having thus described my invention, what I desire to secure by Letters Patent is:

1. A machine of the autoclave type for devulcanizing and regenerating vulcanized rubber, comprising: an outer casing and an inner casing with an annular space between them, a drum rotatably and removably mounted inside the inner casing and constituting a container for the material to be treated, means for bringing a fluid, such as a heating fluid, into direct contact with the material in the container, tubing mounted in the inner casing and surrounding the container, means for admitting heating fluid to the said tubing independently of the admission of fluid to the container, means for admitting heating fluid to said annular space independently of the admission of fluid to the drum and independently of the admission of fluid to the tubing, a removable closure for said inner casing having an aperture therein, said container having an aperture in alignment with the aperture in the closure, sampling means introducible within and withdrawable from the container through the aligned apertures in the closure and container for removing samples of material undergoing treatment, and releasable means positioning said sampling means within the container carried by the closure so that the sample can be collected independent of the rotation of the drum and independent of the control of the heating means and while the inner casing is closed.

2. A machine for devulcanizing and regenerating vulcanized rubber as claimed in claim 1, the sample-withdrawing means comprising: a rotatable hollow trunnion supporting the drum at one end, a rod adapted to be rotatably mounted in and to pass through one end of the autoclave and to pass through the hollow trunnion into the drum a spoon-like member at the inner end of the rod, and releasable means carried by the closure and cooperable with the rod for securing the rod tightly in position to fix the spoon-like member stationary within the drum and said means being operable when released to permit rotation of the rod relative to the drum and withdrawal therefrom through the aperture in the closure.

3. A machine of the autoclave type for devulcanizing and regenerating vulcanized rubber, comprising a casing, a drum rotatably and removably mounted inside said casing and constituting a container for the material to be treated, and means for introducing fluids into the drum and into direct contact with the material therein, said means comprising a rotatable shaft carrying the drum, the shaft being formed with an axial duct having a hemi-spherical mouth at its inner end and with outlet ducts branching from the axial duct to the periphery of the shaft inside the drum, a telescopic injection tube mounted in and passing through the casing in alinement with the shaft, the inner end of the injection tube being rounded to fit said mouth of the axial duct in the shaft, resilient means for keeping the inner end of the telescopic tube pressed against the flared mouth of the axial duct, a distributing member freely suspended from the shaft, and gravitational means for preventing the distributing member from rotating with the shaft, the said distributing member closing the outlet ducts when they are directed downwardly and opening them when they are within a predetermined upper sector.

4. A machine of the autoclave type for devulcanizing and regenerating vulcanized rubber comprising an outer casing and an inner casing having an annular space between the same, a drum rotatably and removably mounted inside the inner casing and constituting a container for the material to be treated, means for bringing heating fluid into direct contact with the material in the container, a tubing mounted in said inner casing a surrounding the container, means for admitting heating fluid to the tubing independently of the admission of fluid to the container, means for admitting heating fluid to said annular space independently of the admission of fluid to the container and independently of the admission of fluid to the tubing, a removable closure closing the inner casing, said container and the closure having aligned apertures therein, and a releasable locking element carried by the exterior of the closure adjacent the aperture therein whereby selective insertion into and withdrawal from the container through the aligned apertures of either sampling means for withdrawing samples of the material undergoing treatment or means for introducing heating fluid into direct contact with the material in the container independent of and in addition to all said other heating means is permitted, said locking element retaining the inserted means within the container.

MANUEL PUNSOLA FABREGAT.

REFERENCES CITED

The following references are of record in the file of this patent:

UNITED STATES PATENTS

| Number | Name | Date |
|---|---|---|
| 646,230 | Marks | Mar. 27, 1900 |
| 697,688 | Stelzer | Apr. 15, 1902 |
| 951,974 | Snyder | Mar. 15, 1910 |
| 1,039,010 | Bardsley | Sept. 17, 1912 |
| 1,153,040 | Debauge | Sept. 7, 1915 |